US012675669B2

(12) United States Patent
Choi et al.

(10) Patent No.: US 12,675,669 B2
(45) Date of Patent: Jul. 7, 2026

(54) ARTIFICIAL INTELLIGENCE LEARNING-BASED USER KNOWLEDGE TRACING SYSTEM AND OPERATING METHOD THEREOF

(71) Applicant: Socra AI Inc., Seoul (KR)

(72) Inventors: Young Duck Choi, Seoul (KR); Young Nam Lee, Seoul (KR); Jung Hyun Cho, Seoul (KR); Jin Eon Baek, Seoul (KR); Byung Soo Kim, Seoul (KR); Yeong Min Cha, Gyeonggido (KR); Dong Min Shin, Seoul (KR); Chan Bae, Seoul (KR); Jae We Heo, Seoul (KR)

(73) Assignee: Socra AI Inc., Seoul (KR)

( * ) Notice: Subject to any disclaimer, the term of this patent is extended or adjusted under 35 U.S.C. 154(b) by 1051 days.

(21) Appl. No.: 17/177,196

(22) Filed: Feb. 16, 2021

(65) Prior Publication Data

US 2021/0256354 A1      Aug. 19, 2021

(30) Foreign Application Priority Data

Feb. 18, 2020    (KR) ........................ 10-2020-0019853
May 14, 2020    (KR) ........................ 10-2020-0057446

(51) Int. Cl.
*G06N 3/045*        (2023.01)
*G06F 17/16*        (2006.01)
                (Continued)

(52) U.S. Cl.
CPC ............. *G06N 3/045* (2023.01); *G06F 17/16* (2013.01); *G06F 17/18* (2013.01); *G06N 5/02* (2013.01)

(58) Field of Classification Search
CPC ........... G06F 17/18; G06N 3/045; G06N 5/02
See application file for complete search history.

(56) References Cited

U.S. PATENT DOCUMENTS

| | | | |
|---|---|---|---|
| 10,943,497 B2 * | 3/2021 | Saini ...................... | G06N 3/084 |
| 11,631,338 B2 * | 4/2023 | Pu ........................... | G09B 7/04 |
| | | | 434/322 |

(Continued)

OTHER PUBLICATIONS

Vaswani, Ashish et al. "Attention is All you Need", 2017. <https://proceedings.neurips.cc/paper_files/paper/2017/hash/3f5ee243547dee91fbd053c1c4a845aa-Abstract.html> (Year: 2017).*

(Continued)

*Primary Examiner* — Tamara T Kyle
*Assistant Examiner* — Tyler Schallhorn
(74) *Attorney, Agent, or Firm* — USX IP LLC

(57) ABSTRACT

The present invention relates to a user knowledge tracing method with more improved accuracy, and an operating method for a user knowledge tracing system including a plurality of encoder neural networks and a plurality of decoder neural networks includes: inputting exercise information to a k-th encoder neural network and inputting response information to a k-th decoder neural network; generating query data, which is information on an exercise for which a user is to predict a correct answer probability, by reflecting a weight to the response information and generating attention information to be used as a weight for the query data by reflecting the weight to the exercise information; and training the user knowledge tracing system by using the attention information as the weight for the query data.

6 Claims, 13 Drawing Sheets

(51) Int. Cl.
  *G06F 17/18*     (2006.01)
  *G06N 5/02*      (2023.01)

(56)              References Cited

U.S. PATENT DOCUMENTS

| | | | | |
|---|---|---|---|---|
| 12,100,315 | B2 * | 9/2024 | Li | G06N 3/045 |
| 2019/0130511 | A1 * | 5/2019 | Davier | A61B 5/486 |
| 2019/0333400 | A1 * | 10/2019 | Saini | G09B 7/00 |
| 2020/0202226 | A1 * | 6/2020 | Nagatani | G06N 3/044 |
| 2021/0390873 | A1 * | 12/2021 | Pu | G06N 3/045 |
| 2021/0398439 | A1 * | 12/2021 | Li | G09B 7/02 |
| 2022/0335309 | A1 * | 10/2022 | Tamano | G06N 5/02 |

OTHER PUBLICATIONS

Bosch, Nigel et al. "Unsupervised Deep Autoencoders for Feature Extraction with Educational Data", 2017. <https://pnigel.com/papers/bosch-dlwed17-camera.pdf> (Year: 2017).*

Pandey, Shalini et al. "A Self-Attentive model for Knowledge Tracing", Jul. 16, 2019. <https://doi.org/10.48550/arXiv.1907.06837> (Year: 2019).*

Wang, Qiang et al. "Learning Deep Transformer Models for Machine Translation", Jun. 5, 2019. <https://doi.org/10.48550/arXiv.1906.01787> (Year: 2019).*

Lee, Jinseok et al. "Knowledge Query Network for Knowledge Tracing: How Knowledge Interacts with Skills", Mar. 4, 2019. <https://doi.org/10.1145/3303772.3303786> (Year: 2019).*

Liu, Qi et al. "EKT: Exercise-Aware Knowledge Tracing for Student Performance Prediction", Jun. 24, 2019, IEEE. <https://doi.org/10.1109/TKDE.2019.2924374> (Year: 2019).*

Dong, Li et al. "Unified Language Model Pre-training for Natural Language Understanding and Generation", 2019. <https://proceedings.neurips.cc/paper_files/paper/2019/hash/c20bb2d9a50d5ac1f713f8b34d9aac5a-Abstract.html> (Year: 2019).*

Pandey, Shalini. SAKT/2019-EDM, GitHub, 2019. Retrieved from <https://github.com/shalini1194/SAKT/tree/master/2019-EDM>. (Year: 2019).*

Pu, Shi et al. Deep Knowledge Tracing with Transformers. Jun. 30, 2020, Springer. <https://doi.org/10.1007/978-3-030-52240-7_46> (Year: 2020).*

He, Yu et al. KT-XL: A Knowledge Tracing Model for Predicting Learning Performance Based on Transformer-XL. Oct. 26, 2020, Association for Computing Machinery. <https://doi.org/10.1145/3393527.3393557> (Year: 2020).*

Notice of Allowance issued Nov. 22, 2022 for Korea App. No. 10-2021-0115659, 7 pages.

Choi et al., "Towards an Appropriate Query, Key, and Value Computation for Knowledge Tracing", arXiv:2002.07033v1 [cs. LG] Feb. 14, 2020. https://arxiv.org/pdf/2002.07033.pdf.

"Transformer", https://medium.com/platfarm/%EC%96%B4%ED%85%90%EC%85%98-%EB%A9%94%EC%BB%A4%EB%8B%88%EC%A6%98%EA%B3%BC-transfomer-self-attention-842498fd3225, 2019, with English translation.

* cited by examiner

E : Exercise        I : Interaction        r* : Correct answer
   information          information              probability
   ———>: Target    ——→ Source              information

FIG 5

<u>Input data</u>

|  | Exercise information (E) | Interaction information (I) | Response information (R) |
|---|---|---|---|
| Exercise identification information | ✓ | ✓ | |
| Exercise category information | ✓ | ✓ | |
| Position information | ✓ | ✓ | ✓ |
| Response accuracy information | | ✓ | ✓ |
| Required time information | | ✓ | |
| Time recording information | | ✓ | |

Key-query masking                    Upper triangular masking

E : Exercise          I : Interaction          r* : Correct answer
  information            information           probability information
    ———▷: Query      ———▶ : Key                -----▶: Value

ARTIFICIAL INTELLIGENCE LEARNING-BASED USER KNOWLEDGE TRACING SYSTEM AND OPERATING METHOD THEREOF

CROSS-REFERENCE TO RELATED APPLICATIONS

This application claims priority to and the benefit of Korean Patent Application No. 10-2020-0019853, filed Feb. 18, 2020 and Korean Patent Application No. 10-2020-0057446, filed May 14, 2020, the disclosures of which are incorporated herein by reference in their entirety.

BACKGROUND OF THE INVENTION

Field of the Invention

The present invention relates to a method and system for tracing user knowledge based on artificial intelligence learning. Specifically, the present invention relates to a user knowledge tracing method and system, which predict a correct answer probability of a user by inputting exercise information to an encoder neural network having a transformer architecture and inputting response information to a decoder neural network.

Description of the Related Art

Recently, the Internet and electronic devices are actively used in various fields, and the educational environment is also rapidly changing. In particular, with the development of various educational media, learners can choose and use a wider range of learning methods. Among them, an education service through the Internet has become a major teaching and learning tool because of advantages of overcoming temporal and spatial constraints and enabling low-cost education.

This online education service is able to provide more efficient learning content by predicting a user's correct answer probability for a certain exercise, which was not possible in an existing offline education environment, by adopting various artificial intelligence models.

Conventionally, various artificial neural network models such as RNN, LSTM, bidirectional LSTM, and transformers have been proposed to predict a user's correct answer probability for a given exercise. However, these existing artificial neural network models have a problem in that a layer is too thin to obtain a desired inference result or the input data optimized for user knowledge tracing is not used, so that results with sufficient accuracy cannot be predicted.

In particular, a transformer model has advantages that a learning speed is very fast and performance is superior to RNN by making an encoder-decoder structure using only attention, not the RNN architecture, so the transformer model begun to attract attention as a user knowledge tracing model, but there is insufficient research to optimize and use the transformer model for learning content.

Specifically, there is a need for a method for predicting a user's correct answer probability more effectively using a transformer model, with respect to how to configure data input to the encoder and decoder of a transformer model to obtain inference results optimized for learning content, what methods can be used to prevent prediction of the correct answer probability based on an exercise which a user has not yet solved due to the nature of learning content, and the like.

SUMMARY OF THE INVENTION

The present invention relates to a user knowledge tracing method with more improved accuracy, and an operating method for a user knowledge tracing system including a plurality of encoder neural networks and a plurality of decoder neural networks includes: inputting exercise information to a k-th encoder neural network and inputting response information to a k-th decoder neural network; generating query data, which is information on an exercise for which a user is to predict a correct answer probability by reflecting a weight to the response information and generating attention information to be used as a weight for the query data by reflecting the weight to the exercise information; and training the user knowledge tracing system by using the attention information as the weight for the query data.

The present invention relates to a user knowledge tracing system having more improved accuracy, and the user knowledge tracing system including a plurality of encoder neural networks and a plurality of decoder neural networks includes: a k-th encoder neural network configured to receive exercise information and generate attention information to be used as a weight for query data by reflecting a weight to the exercise information; and a k-th decoder neural network configured to receive response information, generate the query data, which is information on an exercise for which a user predicts a correct answer probability by reflecting a weight to the response information, and train the user knowledge tracing system using the attention information as a weight for the query data.

BRIEF DESCRIPTION OF THE DRAWINGS

FIG. 5 is a diagram for describing a configuration of each input data.

DETAILED DESCRIPTION OF THE PREFERRED EMBODIMENTS

Figure 1:
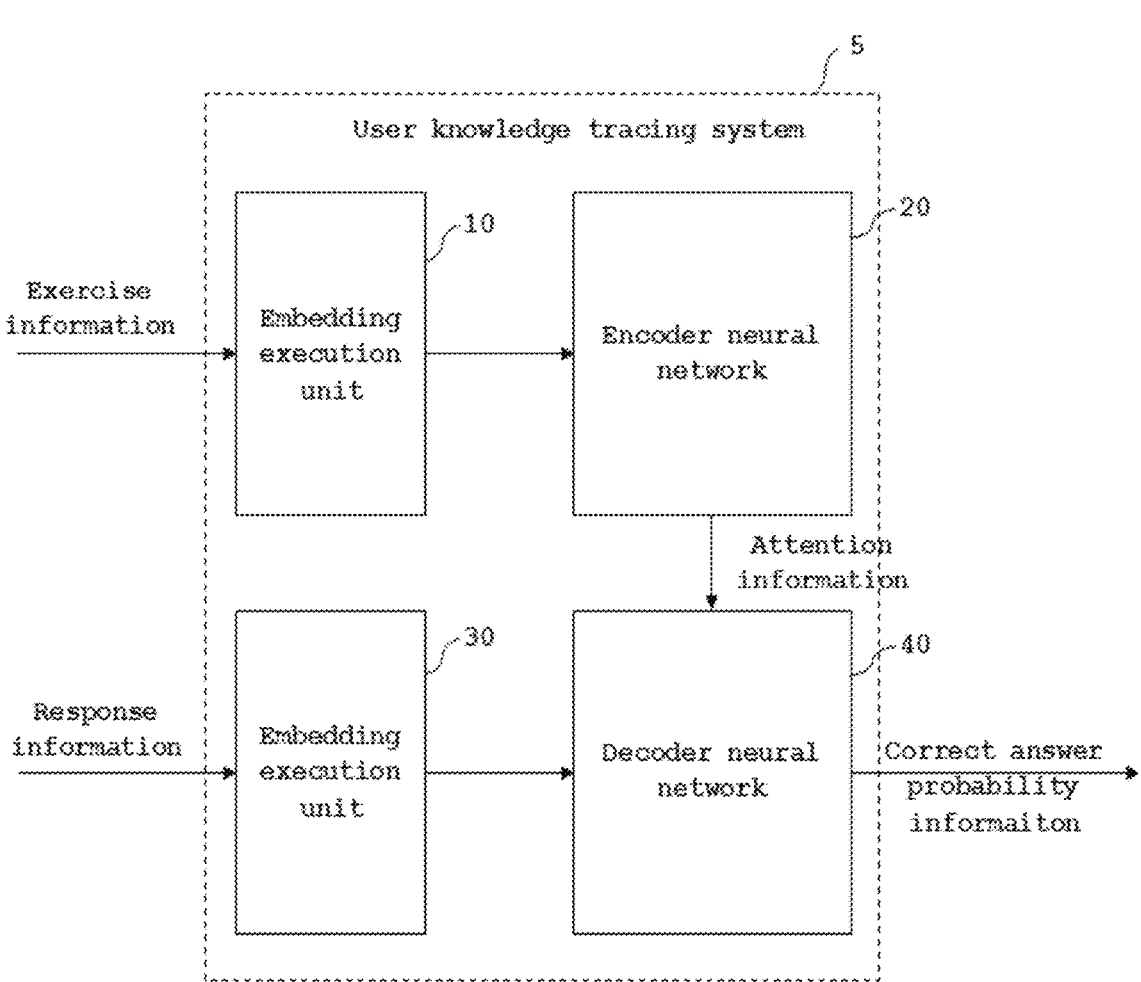
FIG. 1 is a diagram for describing a user knowledge tracing system according to an embodiment of the present invention.

Specific structural or step-by-step descriptions of embodiments according to the concept of the present invention disclosed in this specification or application are exemplified only for the purpose of describing the embodiments according to the concept of the present invention, and embodiments according to the concept of the present invention may be implemented in various forms and should not be construed as being limited to the embodiments described in the present specification or application.

Since the embodiments according to the concept of the present invention can be modified in various ways and have various forms, specific embodiments will be illustrated in the drawings and described in detail in the present specification or application. However, this is not intended to limit the embodiments according to the concept of the present invention to a specific form of disclosure, and it should be understood to include all changes, equivalents, or substitutes included in the spirit and scope of the present invention.

Terms such as first and/or second may be used to describe various elements, but the elements should not be limited by the terms. The above terms are only for the purpose of distinguishing one component from other components, and a first component may be referred to as a second component, and similarly a second component may also be referred to as a first component, for example, without departing from the scope of claims according to the concept of the present invention.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other expressions describing the relationship between components, such as "between" and "just between" or "adjacent to" and "directly adjacent to" should be interpreted in the same manner.

Terms used in the disclosure are used to describe specific embodiments and are not intended to limit the scope of the present invention. As used herein, singular forms may include plural forms as well unless the context clearly indicates otherwise. It will be further understood that the terms "comprises," "comprising," "have," "having," "includes," "including" and/or variations thereof, when used in this specification, specify the presence of stated features, numbers, steps, operations, elements, and/or components, but do not preclude the presence or addition of one or more other features, numbers, steps, operations, elements, components, and/or groups thereof.

Unless otherwise defined, all terms used herein, including technical or scientific terms, have the same meanings as those generally understood by those skilled in the art to which the present disclosure pertains. Such terms as those defined in a generally used dictionary are to be interpreted s having meanings equal to the contextual meanings in the relevant field of art, and are not to be interpreted as having ideal or excessively formal meanings unless clearly defined in the present application.

In describing the embodiments, descriptions of technical contents that are well known in the technical field to which the present invention pertains and are not directly related to the present invention will be omitted. This is to more clearly convey the gist of the present invention by omitting unnecessary description.

Hereinafter, the present invention is described by describing preferred embodiments in detail with reference to the accompanying drawings. Hereinafter, embodiments of the inventive concept will be described in detail with reference to the exemplary drawings.

FIG. 1 is a diagram for describing a user knowledge tracing system according to an embodiment of the present invention.

Referring to FIG. 1, FIG. 1 illustrates a user knowledge tracing system 5 based on a transformer model, and the user knowledge tracing system 5 according to an embodiment may include embedding execution units 10 and 30, an encoder neural network 20, and a decoder neural network 40.

The transformer model is a model implemented only with attention while complying with the encoder-decoder, which is the architecture of an existing seq2seq. The transformer model does not use an RNN, but maintains an encoder-decoder architecture that receives an input sequence in an encoder and outputs an output sequence in a decoder, like the existing seq2seq, and has characteristics that there may be N units of encoder and decoder.

The attention mechanism has been proposed to solve the problems of information loss that results from compressing all information into a single vector with a fixed size, and vanishing gradient, which was pointed out as problems of seq2seq based on RNN.

According to the attention mechanism, every time-step when the decoder predicts an output word, the decoder needs to refer to all of input data from the encoder once again. However, it should be noted that a portion of the input data that is related to data to be predicted at a relevant time point is more attended, rather than referencing all of the input data at the same rate.

Referring back to FIG. 1, the user knowledge tracing system 5 trains an artificial neural network based on a large amount of exercise-solving results by the user for an exercise database, and predicts a probability for a correct answer of a specific user for a certain exercise in the exercise database based on the artificial neural network.

In an educational domain aimed at improving the user's skills, it may be inefficient to provide exercise which the user is sure to correctly answer. It would be efficient to provide an exercise which the user is likely to answer incorrectly, or an exercise which can raise a target test score.

The user knowledge tracing system 5 according to an embodiment of the present invention may generate a user model which more accurately reflects user characteristics, and analyze in real time the types of exercises which have high learning efficiency for the user, for example, the exercise types which a user is likely to answer incorrectly, exercises which raise a target test score, or exercises which a user repeatedly answer incorrectly to provide particularly vulnerable exercise types.

In addition, the user knowledge tracing system 5 may train an artificial neural network based on results of solving a large amount of exercises by the user for an exercise database, and predict a score which a specific user is capable of obtaining on a real test based on the artificial neural network. It is possible to provide user-customized learning according to a predicted score band, and the user can perform more efficient learning.

Referring to FIG. 1, the embedding execution units 10 and 30 may perform embedding on input data. In an embodiment of the present invention, the input data may include exercise information, response information, or interaction information.

The exercise information may be information on exercises having various types and difficulty levels provided to measure a level of knowledge of the user. The response information may be an answer selected by the user in response to the exercise information, or information on whether the user answers a relevant exercise correctly or incorrectly. The interaction information may be information on a set in which the exercise information and the user's response information corresponding thereto are matched.

In an embodiment, exercise information may be expressed as "E" for Exercise, response information may be expressed as "R" for Response, and interaction information may be expressed as "I" for Interaction. The correct answer probability information may be expressed as 'r*'.

The embedding execution units 10 and 30 may execute a function of performing embedding in the user knowledge tracing system 5 by expressing input data, for example, an exercise, a response, or a set of an exercise and a response, as vectors. There are many methods to express the input data as vectors for a latent space. For example, it may be one of methods to quantify words and use them in artificial intelligence. Even when the expressions or forms entered by the user are different, the meaning of words, sentences, and texts may be written by calculating association and indicating the association through a numerical value.

The exercise information expressed as a vector may be embedded in the embedding execution unit 10 and input to the encoder neural network 20. The response information expressed as a vector may be embedded in the embedding execution unit 30 and input to the decoder neural network 40.

According to an embodiment of the present invention, as input data of the transformer model optimized for online learning content, the exercise information is input to the encoder and the response information is input to the decoder, thereby providing the user knowledge tracing system 5 with more improved performance.

The encoder neural network 20 may generate attention information based on the embedded exercise information. The attention information may be exercise information assigned a weight while passing through a plurality of layers of the encoder neural network 20. In particular, the attention information may be information generated through self-attention in the encoder neural network. The attention information may be mathematically expressed by a probability, and the sum of all attention information is 1. The attention information may be input to the decoder neural network 40 and used as a weight for query data of the decoder neural network to be used to train the user knowledge tracing system 5.

The artificial neural network may use the attention information to be trained according to an objective function with respect to which part is important. In particular, the self-attention means that attention is performed on oneself, and may be an operation for assigning a weight to a portion to be considered important in specific data itself and reflecting it back to oneself. Since in attention of the existing seq2seq, a correlation has been found with information of different data such as data on the encoder side and data on the decoder side, information according to self-attention is information that cannot be found with the attention architecture of the existing seq2seq.

In the user knowledge tracing system 5, the encoder neural network 20 may again refer to all input data E1, E2, . . . , Ek, R1, R2, . . . , Rk−1 at each time-step at which the decoder neural network 40 predicts an output result rk*, and the user knowledge tracing system 5 may focus (attention) on data related to a relevant output result according to the attention information.

The decoder neural network 40 may generate a response prediction result based on the embedded response information and the attention information. The decoder neural network 40 may perform multi-head attention, in which the above-described self-attention is performed at least once or more, on response information.

As such, the decoder neural network 40 may generate correct answer probability information by performing multi-head attention on query data generated from the response information, based on the attention information weighted according to a the importance of the exercise information in the encoder neural network 20.

According to an embodiment of the present invention, as input data optimized for the user knowledge tracing, the exercise information is input to the encoder and the response information is input to the decoder, thereby providing the user knowledge tracing system 5 with more improved performance.

In addition, the present invention can provide a user knowledge tracing system 5 having more improved performance by appropriately using upper triangular masking in an encoder neural network and a decoder neural network having a transformer architecture.

Figure 2:
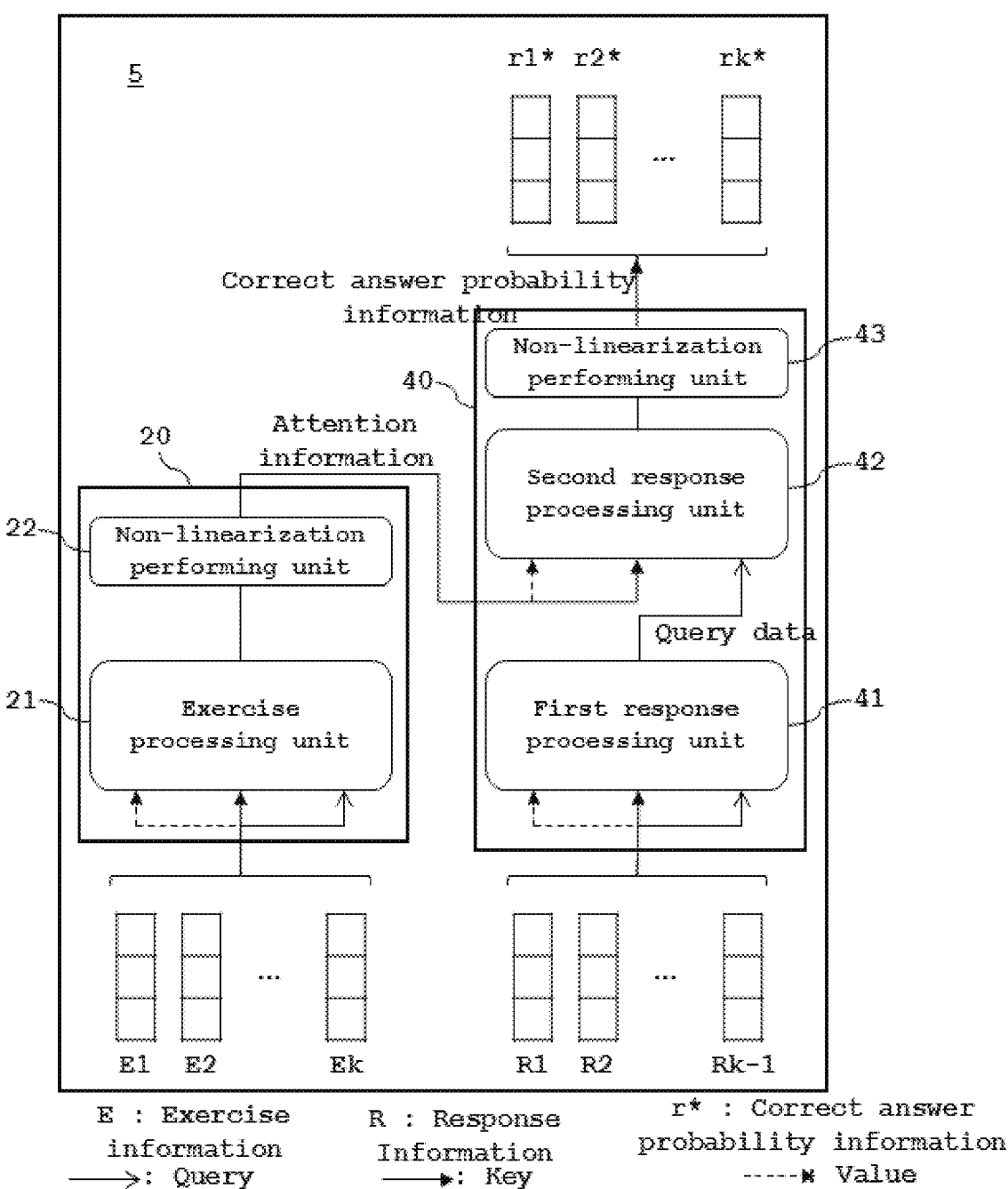
FIG. 2 is a diagram for describing the operation of the user knowledge tracing system of FIG. 1 in detail.

FIG. 2 is a diagram for describing the operation of the user knowledge tracing system of FIG. 1 in detail.

Referring to FIG. 2, the user knowledge tracing system 5 may include an encoder neural network 20 and a decoder neural network 40. Further, the encoder neural network 20 may include an exercise processing unit 21 and a non-linearization performing unit 22, and the decoder neural network 40 may include a first response processing unit 41, a second response processing unit 42, and a non-linearization performing unit 43.

Although the embedding performing unit of FIG. 1 is omitted in FIG. 2, the operation for embedding input data may be understood with reference to the description with reference to FIG. 1 described above.

The exercise information may be composed of a plurality of exercises E1, E2, . . . , Ek expressed as vectors. The response information may be composed of a user's responses R1, R2, . . . , Rk−1 to the plurality of exercises E1, E2, . . . , Ek expressed as vectors. The correct answer probability information may be composed of the user's correct answer probabilities r1*, r2*, . . . , rk* for the exercises expressed as vectors.

In an embodiment, the correct answer probability information rk* may be information on a probability that the user will correctly answer an exercise Ek−1 when a user response to the exercise E1 is R1, a user response to the exercise E2 is R2, . . . , and a user response to the exercise Ek−1 is Rk−1.

The exercise processing unit 21 may receive the exercise information and perform a series of operations related to self-attention. The operation may include dividing the exercise information into queries, keys, and values, generating a plurality of head values for the queries, the keys, and the values, respectively, generating weights from a plurality of query-head values and a plurality of key-head values, performing masking the generated weights, and generating prediction data by applying the masked weights to a plurality of value-head values.

The prediction data generated by the exercise processing unit 21 may be attention information.

In particular, the exercise processing unit 21 may perform key-query masking as well as upper triangular masking during the masking operation. The key-query masking and the upper triangular masking will be described in detail in the description with reference to FIG. 6 to be described later.

The non-linearization performing unit 22 may perform an operation of non-linearizing the prediction data output from the exercise processing unit 21. An ReLU function can be used for non-linearization.

Although not shown in the drawing, the encoder neural network 20 may exist at least one or more. Attention information generated by the encoder neural network 20 is input to the encoder neural network 20 again, and a series of operations related to self-attention and non-linearization may be performed repeatedly several times.

Thereafter, the attention information may be divided into key values and value values and input to the second response processing unit. The attention information may be used as a weight for query data input to the second response processing unit and used to train the user knowledge tracing system.

The first response processing unit 41 may receive response information and perform a series of operations related to self-attention like the exercise processing unit 21. The operation may include dividing the exercise information into queries, keys, and values, generating a plurality of head values for the queries, the keys, and the values, generating weights from a plurality of query-head values and a plurality of key-head values, performing masking the generated weights, and generating prediction data by applying the masked weights to a plurality of value-head values.

The prediction data generated by the first response processing unit 41 may be query data.

The second response processing unit 42 may receive query data from the first response processing unit and attention information from the encoder neural network 20, and may output correct answer probability information.

The attention information may be input to the decoder neural network 40 and used as a weight for query data of the decoder to be used to train the user knowledge tracing system 5.

The attention information may be information about a weight assigned to pay attention to a specific area of the query data. Specifically, in the user knowledge tracing system 5, the encoder neural network 20 may again refer to all input data E1, E2, . . . , Ek, R1, R2, . . . , Rk−1 at each time point at which the decoder neural network 40 predicts an output result rk*, and the user knowledge tracing system 5 may focus (attention) on data related to a relevant output result.

The second response processing unit 42 may generate rk*, which is the user's correct answer probability information for the exercise information Ek according to the operation.

Although not shown in the drawing, the decoder neural network 40 may exist at least one or more. The correct answer probability information generated by the decoder neural network 40 may be input to the decoder neural network 40 again, and a series of operations related to self-attention, multi-head attention, and non-linearization may be performed repeatedly several times.

Like the exercise processing unit 21, the first response processing unit 41 and the second response processing unit may perform key-query masking as well as upper triangular masking during a masking operation.

Figure 3:
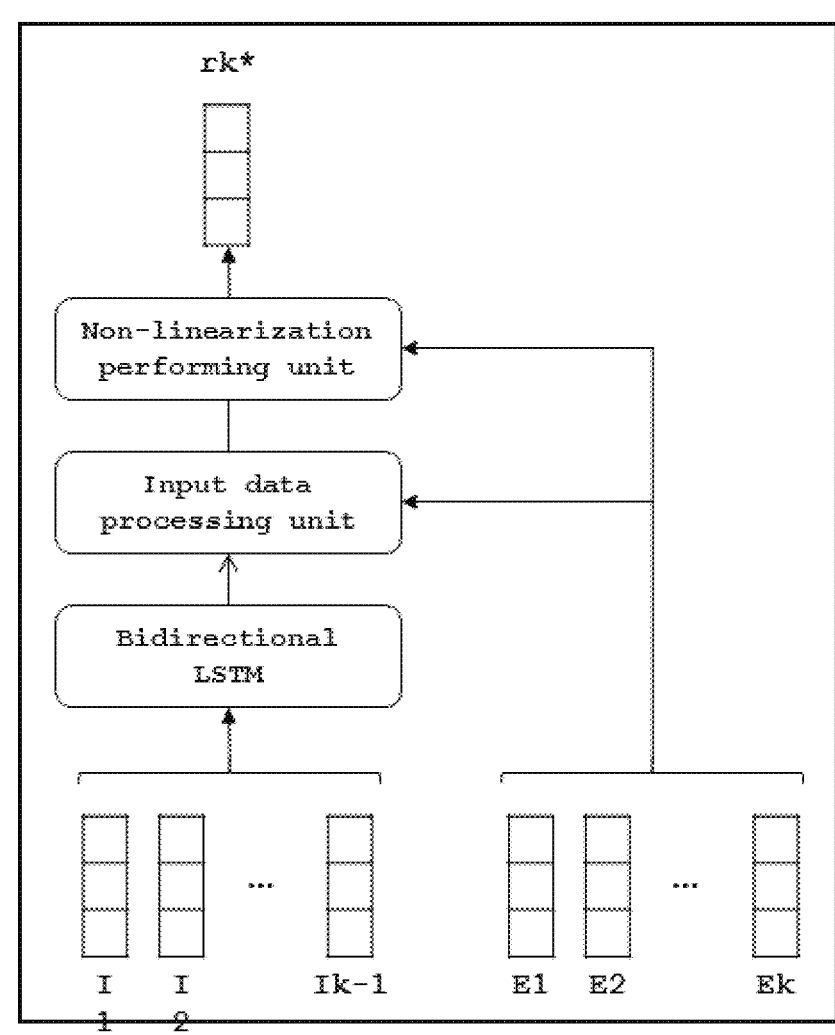
FIG. 3 is a diagram for explaining an example of an artificial neural network architecture used in a conventional user knowledge tracing system.

FIG. 3 is a diagram for explaining an example of an artificial neural network architecture used in a conventional user knowledge tracing system.

In the user knowledge tracing system of FIG. 3, there is shown an input data processing unit that performs an operation to focus (attention) on a specific portion of input data related to data to be predicted.

However, in the knowledge tracing system of FIG. 3, since the layer of the input data processing unit is not deep enough, there is a limitation in which a number of exercises and user responses thereto are not correctly analyzed.

Figure 4:
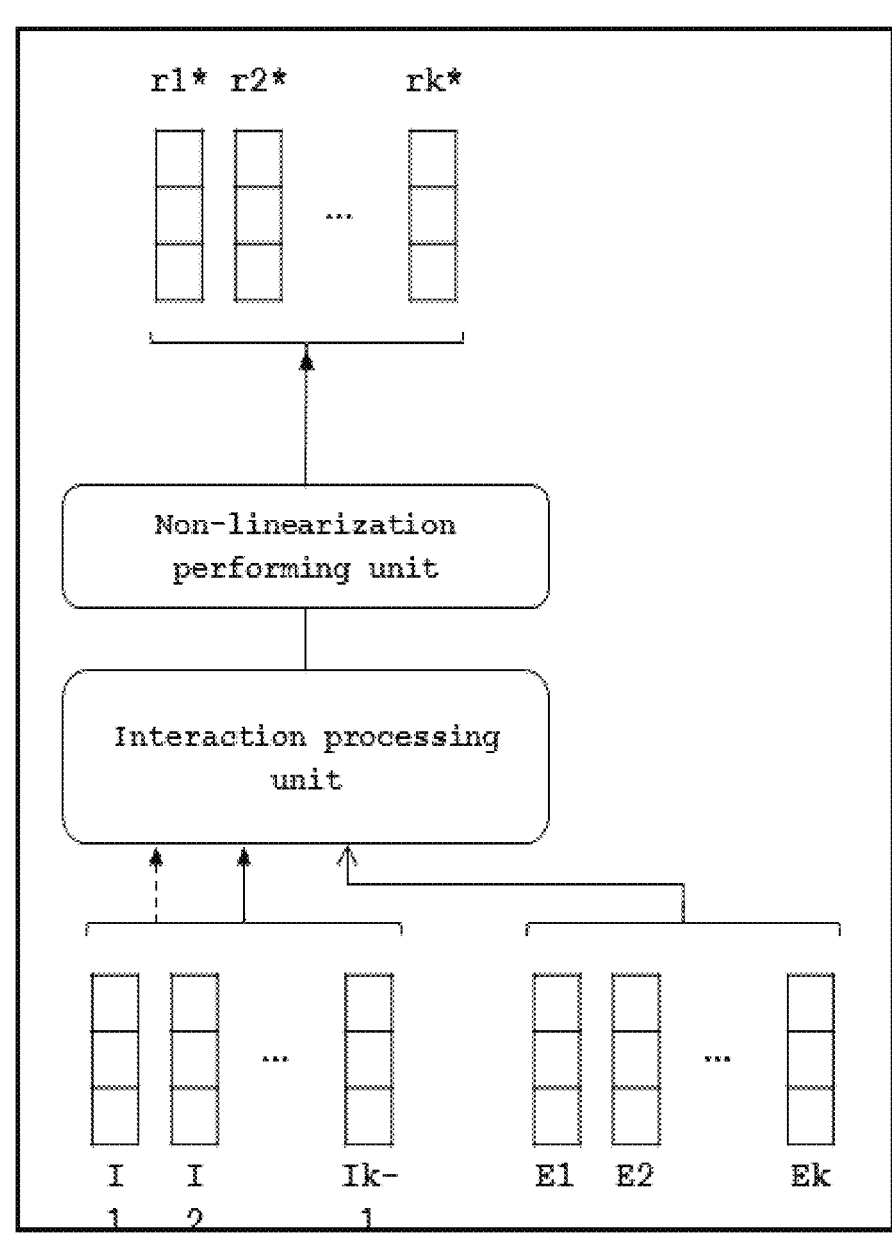
FIG. 4 is a diagram for explaining another example of an artificial neural network architecture used in a conventional user knowledge tracing system.

FIG. 4 is a diagram for explaining another example of an artificial neural network architecture used in a conventional user knowledge tracing system.

The user knowledge tracing system of FIG. 4 may include an interaction processing unit and a non-linearization performing unit that perform an operation similar to that of the encoder neural network or decoder neural network of FIG. 2.

However, in the knowledge tracing system of FIG. 4, there is a problem in that a limitation of an existing system, in which the interaction information (I) is provided as key and value and the exercise information (E) is provided as query, is not overcome.

In order to solve such a problem, the user knowledge tracing system according to an embodiment of the present invention can implement an artificial neural network with improved accuracy by predicting a correct answer probability using only exercise information and response information having a smaller amount of data than the interaction information, and sufficiently deeply implementing a layer in which attention is performed.

FIG. 5 is a diagram for describing configuration of each input data according to an embodiment of the present invention.

Referring to FIG. 5, input data may include exercise information (E), interaction information (I), and response information (R). Depending on an artificial neural network model implemented, specific data may be selected and used among three input data.

Exercise identification information may be a unique value assigned to each exercise. A user or computer may identify what a relevant exercise is through the exercise identification information.

Exercise category information may be information indicating what type the relevant exercise has. For example, in TOEIC test exercises, an exercise category may be information indicating whether an exercise is a listening part or a reading part.

Position information may be information indicating where corresponding data is located in the entire data. Since the transformer architecture does not display the sequence of input data unlike the RNN architecture, it is necessary to separately indicate where each data is located in the whole data sequence in order to distinguish the sequence. The position information may be embedded together with the input data, added to the embedded input data, and input to an encoding neural network and a decoding neural network.

Response accuracy information may be information indicating whether the user's response is a correct answer or an incorrect answer. For example, when the user's response is a correct answer, it may be expressed as a vector representing '1'. Conversely, when the user's response is an incorrect answer, it may be expressed as a vector representing '0'.

Required time information may be information representing a time required for a user to solve an exercise as a vector. The required time information may be expressed in seconds, minutes, hours, and the like, and it may be determined that the time exceeding a certain time (for example, 300 seconds) has taken as much as the corresponding time (300 seconds).

Time recording information may be information representing a time point at which a user solves an exercise as a vector. The time recording information may be expressed as time, day, month, year, or the like.

The exercise information (E) may include the exercise identification information, the exercise category information, and the position information. In other words, the exercise information (E) may include information on what exercise the corresponding exercise is, what type the corresponding exercise has, and where the corresponding exercise is located in the whole exercise data.

The response information (R) may include the position information and the response accuracy information. That is, the response information (R) may include information on where the user's response is located in the whole response data and whether the user's response is a correct answer or an incorrect answer.

The interaction information (I) may include the exercise identification information, the exercise category information, the position information, the response accuracy information, the required time information, and the time recording information. The interaction information may additionally include the required time information and the time recording information in addition to all the information of the exercise information (E) and the response information (R).

The user knowledge tracing system according to an embodiment of the present invention can predict the correct or incorrect answer of the user by using only the exercise information (E) and the response information (R) instead of the interaction information (I) such that the amount of data used is reduced, thus increasing computational performance and having increased memory efficiency. In addition, in terms of accuracy, the exercise information (E) is input to the encoder and the response information (R) is input to the decoder to optimize an online learning environment, thereby predicting t the correct answer probability with more improved accuracy.

Figure 6:
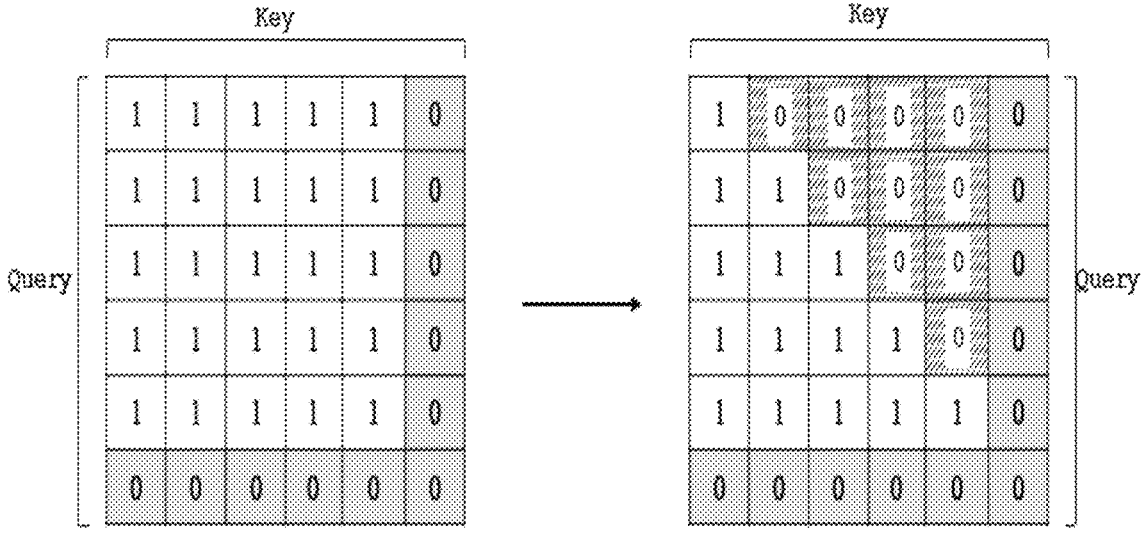
FIG. 6 is a diagram for describing key-query masking and upper triangular masking.

FIG. 6 is a diagram for describing key-query masking and upper triangular masking.

Although FIG. 6 shows that the upper triangular masking is performed after the key-query masking, the upper triangular masking and the key-query masking both may be performed simultaneously, or the upper triangular masking may be performed first.

The key-query masking is optional, and may be an operation in which attention is not performed by imposing a penalty on a value without a value (zero padding). A value of prediction data on which key-query masking has been performed may be expressed as 0, and the remaining portion may be expressed as 1.

Although, in the key-query masking of FIG. 6, the last values of the Query and the Key are masked for convenience of description, this may be variously changed according to embodiments.

Upper triangular masking may be an operation for preventing attention from being performed on information corresponding to a future position for prediction of a next exercise. For example, it may be an operation for performing masking to prevent a prediction value from being calculated from an exercise that the user has not yet solved. Like the key-query masking, a value of prediction data on which upper triangular masking has been performed may be expressed as 0, and the remaining portion may be expressed as 1.

Values of the masked prediction data may be controlled to have a probability close to zero when a random large negative value is reflected and expressed probabilistically through a soft-max function.

In the conventional transformer architecture, the key-query masking is performed in the encoder neural network, and upper triangular masking is performed in addition to the key-query masking in the decoder neural network. In an embodiment of the present invention, by performing upper triangular masking in both the encoder neural network and the decoder neural network, it can be controlled such that correct answer probability information depends only on exercise information (E1, E2, . . . , Ek) previously provided to the user and response information (R1, R2, . . . , Rk−1) previously submitted by the user.

Figure 7:
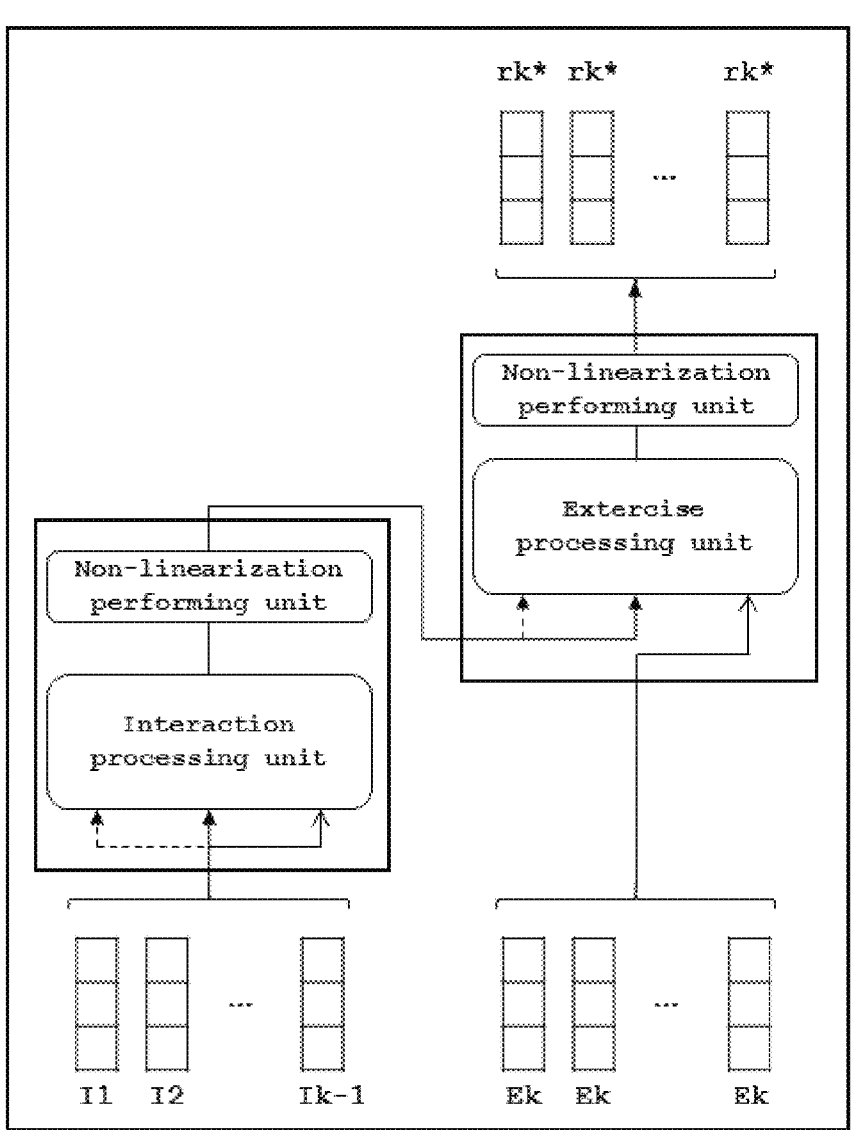
FIG. 7 is a diagram for describing an artificial neural network architecture that outputs a response prediction result using lower triangular masking and interaction information.

FIG. 7 is a diagram for describing an artificial neural network architecture that outputs a response prediction result using lower triangular masking and interaction information.

Referring to FIG. 7, interaction information may be input to an encoder neural network as input data, and exercise information may be input to a decoder neural network as input data. In addition, the decoder neural network may only perform multi-head attention in which self-attention is omitted.

Furthermore, the interaction processing unit and the exercise processing unit of FIG. 7 may perform attention in which an upper triangle of prediction data is not masked, but a lower triangle is masked.

Figure 8:
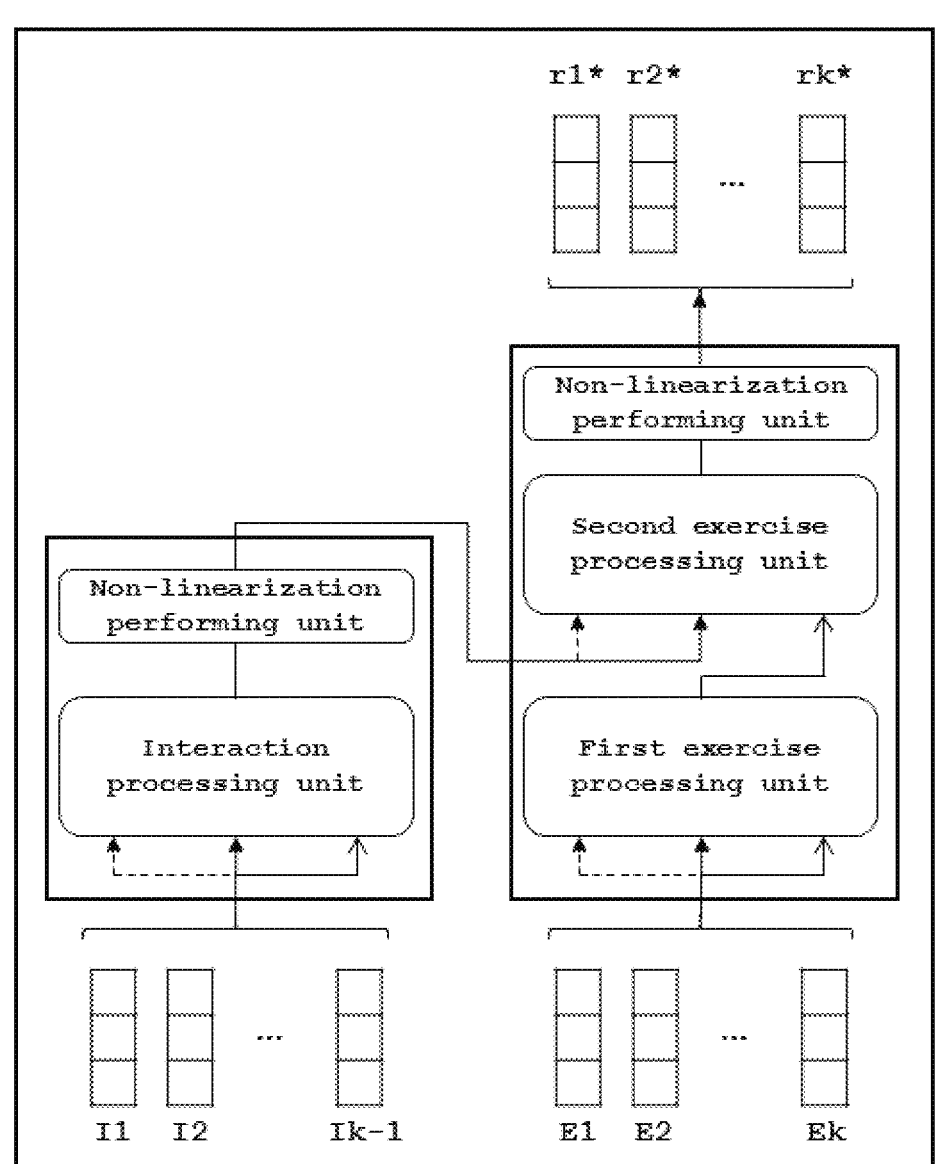
FIG. 8 is a diagram for describing an artificial neural network architecture that outputs a response prediction result using upper triangular masking and interaction information.

FIG. 8 is a diagram for describing an artificial neural network architecture (UTMTI) that outputs a response prediction result using upper triangular masking and interaction information.

Referring to FIG. 8, interaction information may be input to an encoder neural network as input data, and exercise information may be input to a decoder neural network as input data.

Figure 9:
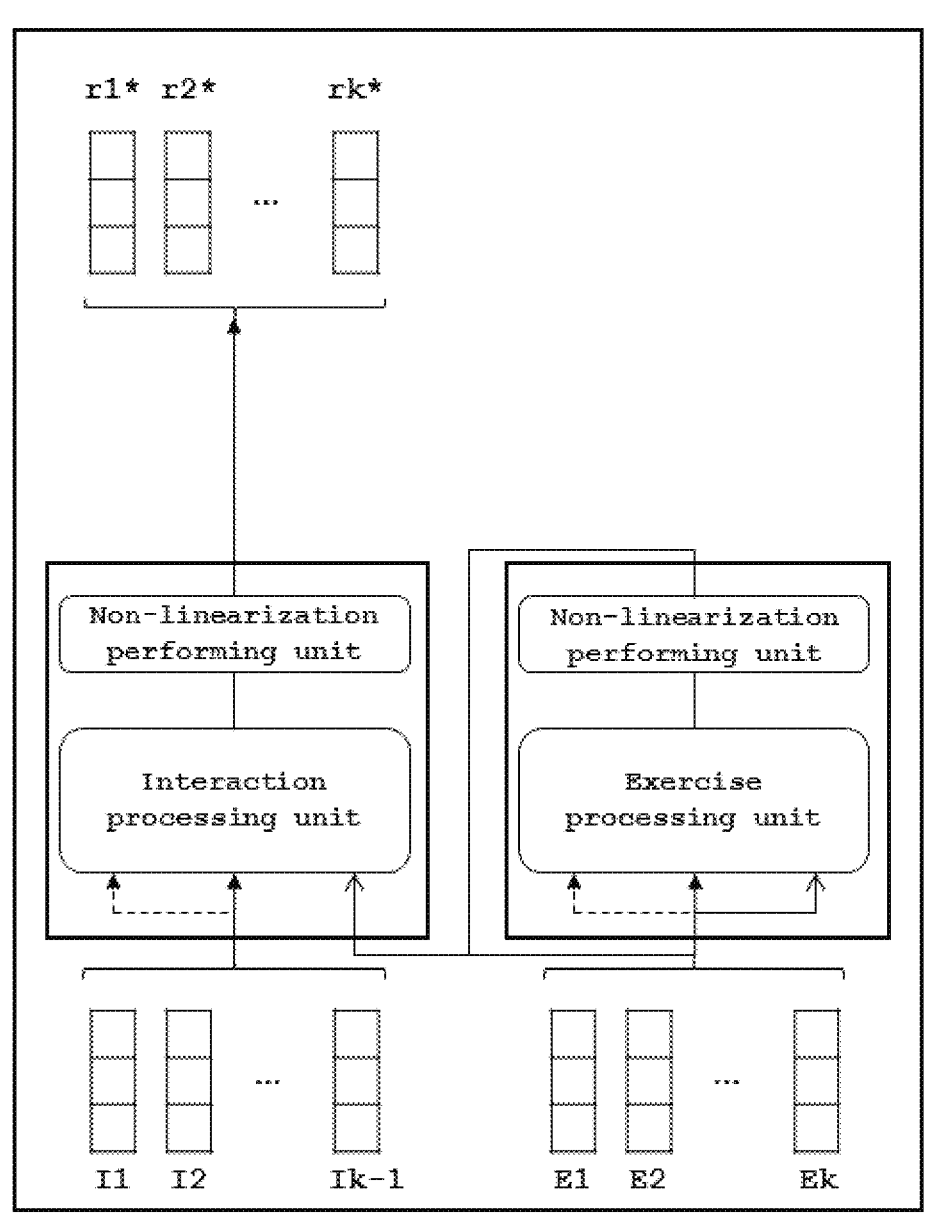
FIG. 9 is a diagram for describing of an artificial neural network architecture that outputs a response prediction result using upper triangular masking, interaction information, and a stacked SAKT.

FIG. 9 is a diagram for describing an artificial neural network architecture (SSAKT) that outputs a response prediction result using upper triangular masking, interaction information, and stacked SAKT.

Referring to FIG. 9, interaction information may be input to an encoder neural network as input data, and exercise information may be input to a decoder neural network as input data. In addition, the interaction processing unit may perform multi-head attention instead of self-attention, and the response processing unit may perform self-attention.

Figure 10:
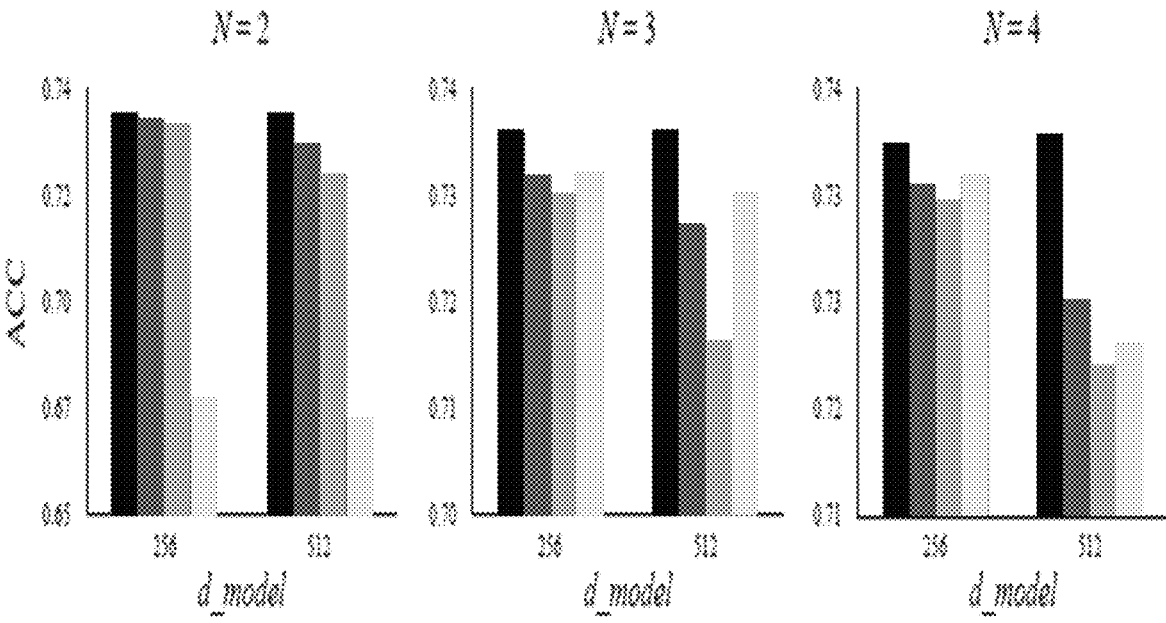
FIG. 10 is a graph for comparing ACC performance of the artificial neural network architectures of FIGS. 2 and 7 to 9.

FIG. 10 is a graph for comparing ACC performance of the artificial neural network architectures of FIGS. 2 and 7 to 9.

ACC can be an indicator of sensitivity. ACC may indicate the proportion of response information that is a correct answer among all response information with an incorrect answer. N may denote the number of stacked encoders and decoders. d_model may denote the output order of all lower layers of the model. The user knowledge tracing system of FIG. 2 is indicated by SAINT.

As a result of statistics, it can be seen that, on average, the ACC of SAINT is about 1.8% higher than that of other models.

Figure 11:
FIG. 11 is a graph for comparing AUC performance of the artificial neural network architectures of FIGS. 2 and 7 to 9.
Figure 11:
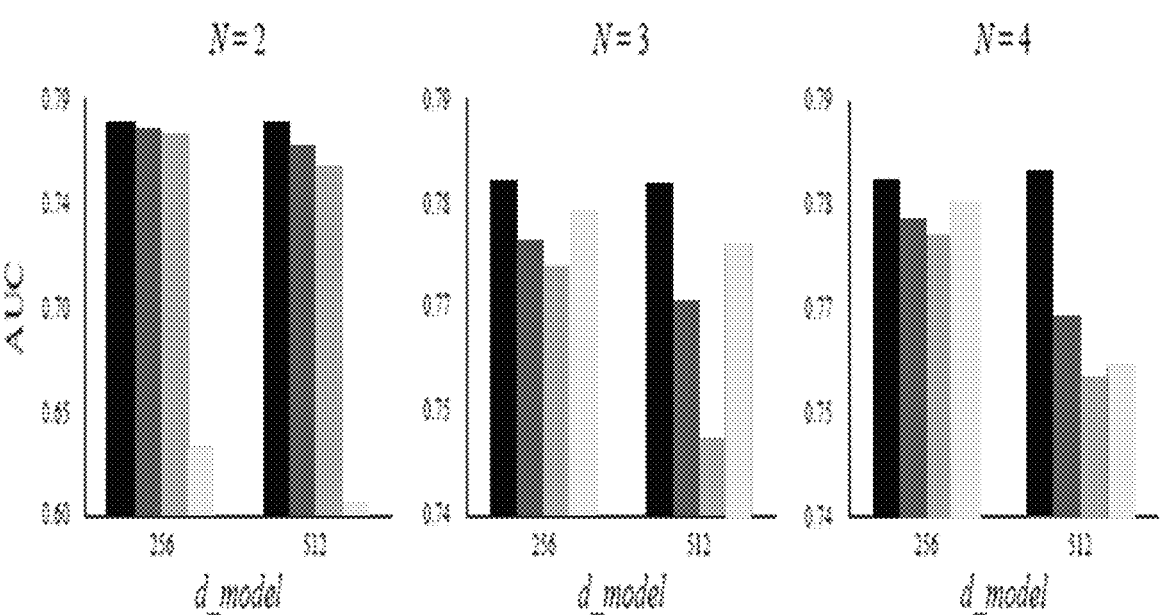

FIG. 11 is a graph for comparing AUC performance of the artificial neural network architectures of FIGS. 2 and 7 to 9.

AUC may represent the ratio of the correct prediction to the overall prediction. N may denote the number of stacked encoders and decoders. d_model may denote the output order of all lower layers of the model. The user knowledge tracing system of FIG. 2 is indicated by SAINT.

As a result of statistics, it can be seen that, on average, the AUC of SAINT is about 1.07% higher than that of other models.

Figure 12:
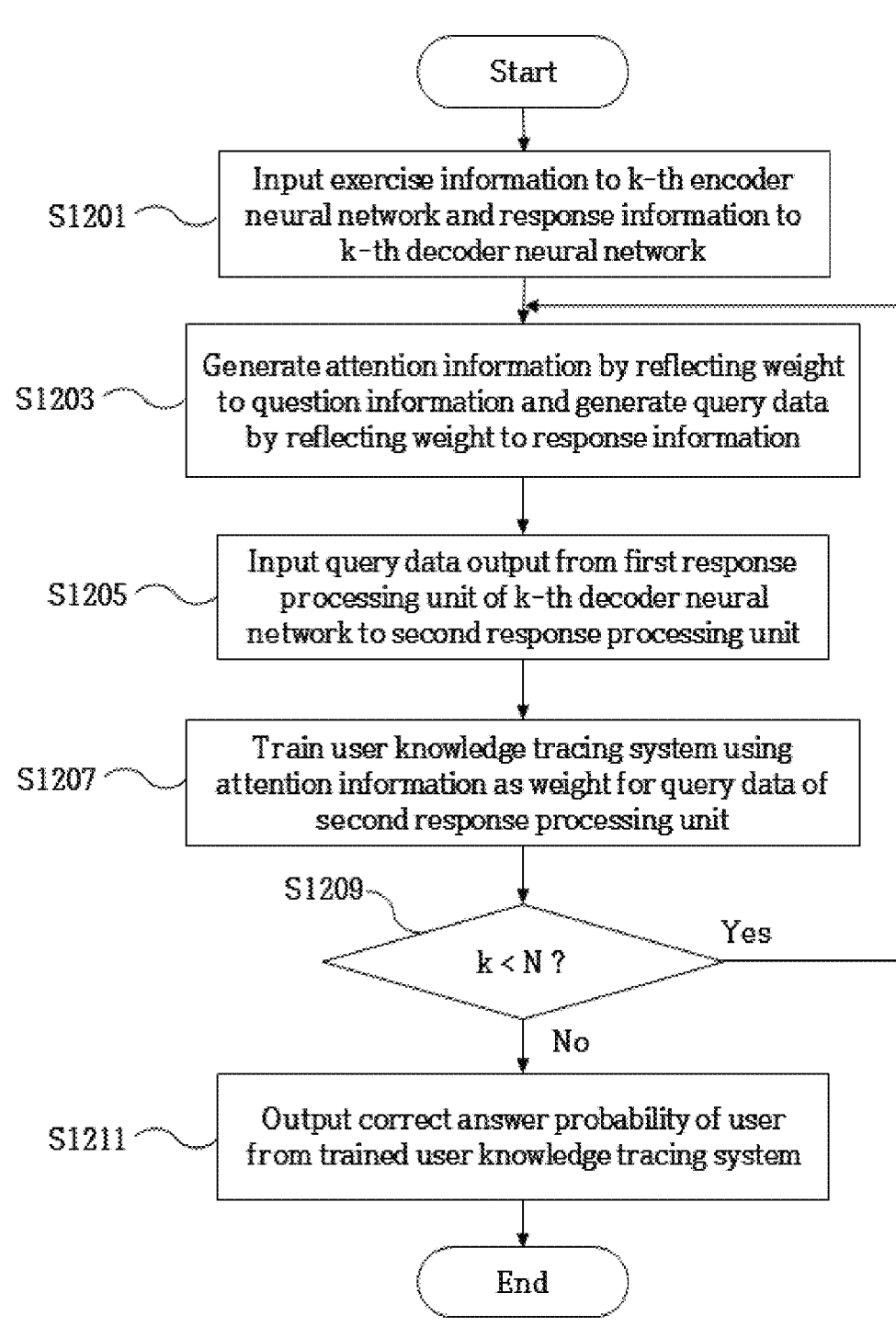
FIG. 12 is a flowchart for describing an operation of a user knowledge tracing system according to an embodiment of the present invention.

FIG. 12 is a flowchart for describing an operation of a user knowledge tracing system according to an embodiment of the present invention.

Referring to FIG. 12, in step S1201, the user knowledge tracing system may input exercise information to a k-th encoder neural network and response information to a k-th decoder neural network, respectively.

The exercise information (E) may include the exercise identification information, the exercise category information, and the position information. In other words, the exercise information (E) may include information on what exercise the corresponding exercise is, what type the exercise has, and where the exercise is located in the whole exercise data.

The response information (R) may include the position information and the response accuracy information. That is, the response information (R) may include information on where the user's response is located in the whole response data and whether the user's response is a correct answer or an incorrect answer.

In step S1203, the user knowledge tracing system may generate attention information by reflecting a weight to the exercise information, and generate query data by reflecting a weight to the response information.

Specifically, the weight of the exercise information may be reflected to the exercise information itself through self-attention. The self-attention may be an operation for assigning a weight to a portion to be considered important in specific data itself and reflecting it back to oneself.

Weights may be reflected on the response information by performing not only self-attention but also multi-head attention based on the attention information.

In step S1205, query data output from the first response processing unit of the k-th decoder neural network may be input to the second response processing unit. The query data may be prediction data output from the first response processing unit.

In step S1207, the user knowledge tracing system may train the user knowledge tracing system by using the attention information as a weight for query data of the second response processing unit.

In step S1209, the user knowledge tracing system may compare k and N, and when k is greater than or equal to N, performs step S1211, and when k is less than N, returns to step S1203 and performs steps S1203 to S1207 again.

Since the encoder neural network and the decoder neural network can be stacked as many as N, the above process can be repeatedly performed for all of the stacked encoder neural networks and the stacked decoder neural networks until the operation is finished.

In step S1211, the user knowledge tracing system may output the user's correct answer probability information from the trained user knowledge tracing system.

This is an inference process, and it is possible to process input data according to a weight determined in a learning process, and output correct answer probability information indicating a correct answer probability of an exercise solved by a user.

Figure 13:
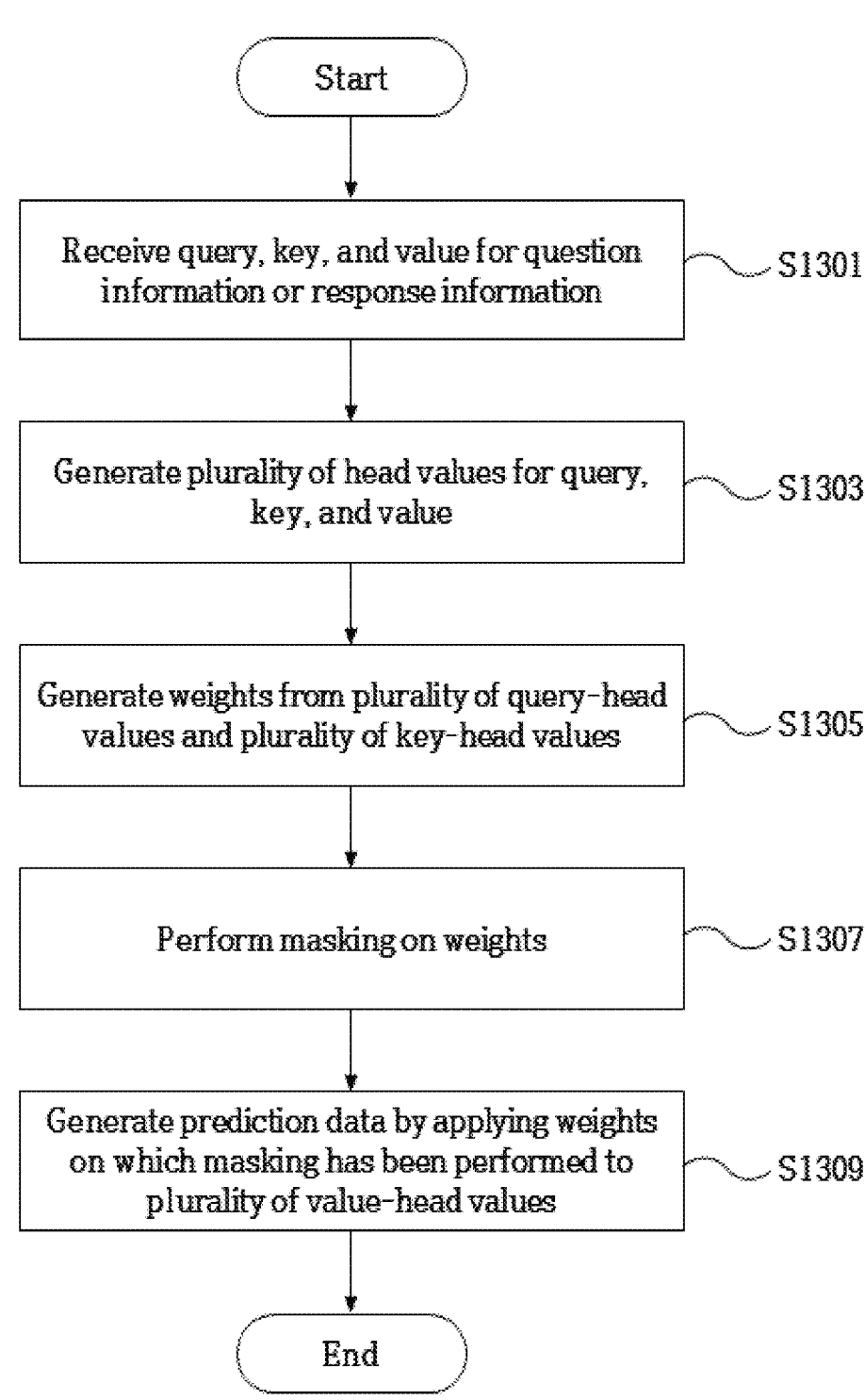
FIG. 13 is a flowchart illustrating in detail an operation of an exercise processing unit, a response processing unit, or an interaction processing unit according to an embodiment of the present invention.

FIG. 13 is a flowchart for describing, in detail, an operation of an exercise processing unit, a response processing unit, or an interaction processing unit according to an embodiment of the present invention.

Referring to FIG. 13, in step S1301, each component may receive query, key, and value for exercise information or response information.

The value of each of the query, the key, and the value may be a value expressed as a vector, and may be a value classified according to a role used.

In step S1303, each component may generate a plurality of head values for each of the query, the key, and the value.

In step S1305, each component may generate weights from a plurality of query-head values and a plurality of key-head values, and in step S1307, masking operation including key-query masking and upper triangular masking may be performed.

The key-query masking is optional, and may be an operation in which attention is not performed by imposing a penalty on a value without a value (zero padding). A value of prediction data on which upper triangular masking has been performed may be expressed as 0, and the remaining portion may be expressed as 1.

Upper triangular masking may be an operation for preventing attention from being performed on information corresponding to a future position for prediction of a next exercise. For example, it may be an operation for performing masking to prevent a predicted value from being calculated from an exercise that the user has not yet solved. Like the key-query masking, a value of prediction data on which upper triangular masking has been performed may be expressed as 0, and the remaining portion may be expressed as 1.

Thereafter, in step S1309, prediction data may be generated by applying the masked weight to a plurality of value-head values.

The prediction data generated by the exercise processing unit may be attention information, the prediction data generated by the first response processing unit may be query data, and the prediction data generated by the second response processing unit may be correct answer probability information.

The user knowledge tracing system according to the present invention can have improved performance by using an optimized input data format and appropriately using upper triangular masking for an encoder neural network and a decoder neural network having a transformer architecture.

The present invention is to solve the above-described problem, and provides a user knowledge tracing system having improved performance by using an input data format optimized for user knowledge tracing.

In addition, the present invention provides a user knowledge tracing system with improved performance by appropriately using upper triangular masking in an encoder neural network and a decoder neural network having a transformer architecture.

The embodiments of the present invention disclosed in the present specification and drawings are provided only to provide specific examples to easily describe the technical contents of the present invention and to aid understanding of the present invention, and are not intended to limit the scope of the present invention. It is obvious to those of ordinary skill in the art that other modifications based on the technical idea of the invention can be implemented in addition to the embodiments disclosed therein.

What is claimed is:

1. An operating method for a user knowledge tracing system configured to receive exercise information and response information and output correct answer probability information and including a first embedding execution unit, a second embedding execution unit, a plurality of encoder neural networks and a plurality of decoder neural networks, wherein the plurality of encoder neural networks include a first encoder neural network and a second encoder neural network, wherein the plurality of decoder neural networks include a first decoder neural network and a second decoder neural network, wherein the first encoder neural network has a transformer model architecture and includes an exercise processing unit and a first non-linearization performing unit, wherein the first decoder neural network has a transformer model architecture and includes a first response processing unit, a second response processing unit and a second non-linearization performing unit, wherein the operating method comprises:

receiving, by the first encoder neural network, only the exercise information as input among the exercise information and the response information, wherein the receiving of only the exercise information as input comprises performing, by the first embedding execution unit, embedding of only the exercise information among the exercise information and the response information, the exercise information being composed of a plurality of exercises E1, E2, . . . , Ek and inputting, by the first embedding execution unit, the embedded exercise information composed of the plurality of exercises E1, E2, . . . , Ek to the exercise processing unit of the first encoder neural network, wherein the exercise information includes (i) exercise identification information being a unique value assigned to each of the plurality of exercises, (ii) exercise category information indicating a type of each of the plurality of exercises, and (iii) position information indicating a position of corresponding data in a sequence of an entire input data to separately indicate where the corresponding data is located in the sequence of the entire input data, and wherein the position information is embedded together with the input data, added to the embedded input data, and input to the exercise processing unit of the first encoder neural network, generating, by the exercise processing unit, prediction data by performing operations of self-attention on the embedded exercise information, performing, by the first non-linearization performing unit, non-linearization on the prediction data to generate non-linearized prediction data, the generated non-linearized prediction data being first attention information, performing, by the second encoder neural network, operations of self-attention and non-linearization on the first attention information to generate second attention information, wherein the operations of self-attention and non-linearization performed by the second encoder neural network correspond to the operations of self-attention and non-linearization performed by the first encoder neural network, receiving, by the first decoder neural network, only the response information as input among the exercise information and the response information, wherein the receiving of only the response information as input comprises performing, by the second embedding execution unit, embedding of only the response information among the exercise information and the response information, the response information being composed of a plurality of responses R1, R2, . . . , Rk−1 of a user, and inputting, by the second embedding execution unit, the embedded response information composed of the plurality of responses R1, R2, . . . , Rk−1 to the first response processing unit of the first decoder neural network, wherein the response information includes (i) position information indicating a position of corresponding data in a sequence of an entire input data to separately indicate where the corresponding data is located in the sequence of the entire input data, and (ii) response accuracy information indicating whether the user's response is a correct answer or an incorrect answer, and wherein the position information is embedded together with the input data, added to the embedded input data, and input to the first response processing unit of the first decoder neural network, generating, by the first response processing unit, prediction data by performing operations of self-attention on the embedded response information, the prediction data generated by the first response processing unit being query data, generating, by the second response processing unit, a correct answer probability of the exercise Ek based on the embedded response information and the second attention information by applying the second attention information as a weight for the query data, performing, by the second non-linearization performing unit, non-linearization on information output from the second response processing unit, training the user knowledge tracing system by using the second attention information as the weight for the query data, and performing, by the second decoder neural network, operations of self-attention and non-linearization based on the correct answer probability of the exercise Ek to generate information corresponding to the correct answer probability of the exercise Ek, and wherein the operations of self-attention and non-linearization performed by the second decoder neural network correspond to the operations of self-attention and non-linearization performed by the first decoder neural network, and wherein the operating method comprises:

performing, by the exercise processing unit of the first encoder neural network, a first upper triangular masking on only the exercise information among the exercise information and the response information, and performing, by the first response processing unit of the first decoder neural network, a second upper triangular masking on only the response information among the exercise information and the response information, wherein the first upper triangular masking and the second upper triangular masking are respectively performed in the first encoder neural network and the first decoder neural network, wherein each of the first upper triangular masking and the second upper triangular masking is an operation for preventing attention from being performed on information corresponding to a future position for prediction of a next exercise.

2. The operation method of claim 1, wherein the plurality of encoder neural networks are stacked and further include at least one encoder neural network in addition to the first and second encoder neural networks, and the plurality of decoder neural networks are stacked and further include at least one decoder neural network in addition to the first and second decoder neural networks, and an operation of generating attention information is repeatedly performed in each of the plurality of encoder neural networks.

3. The operation method of claim 2, further comprising:

completing training of the user knowledge tracing system and outputting information corresponding to the correct answer probability of the exercise Ek, which is a probability that the user correctly answers the exercise Ek.

4. The operation method of claim 1, wherein the plurality of exercises are expressed as vectors, wherein the plurality of responses are expressed as vectors.

5. A non-transitory computer-readable recording medium having recorded thereon a computer program for executing the operation method of claim 1.

6. A user knowledge tracing system configured to receive exercise information and response information and output correct answer probability information and including a first embedding execution unit, a second embedding execution unit, a plurality of encoder neural networks and a plurality of decoder neural networks, the system comprising:

wherein the plurality of encoder neural networks include a first encoder neural network and a second encoder neural network, wherein the plurality of decoder neural networks include a first decoder neural network and a second decoder neural network, wherein the first encoder neural network has a transformer model architecture and includes an exercise processing unit and a first non-linearization performing unit, wherein the first decoder neural network has a transformer model architecture and includes a first response processing unit, a second response processing unit and a second non-linearization performing unit, wherein the first encoder neural network is configured to receive only the exercise information as input among the exercise information and the response information, wherein the first embedding execution unit is configured to:

perform embedding of only the exercise information among the exercise information and the response information, the exercise information being composed of a plurality of exercises E1, E2, . . . , Ek and input the embedded exercise information composed of the plurality of exercises E1, E2, . . . , Ek to the exercise processing unit of the first encoder neural network, wherein the exercise information includes (i) exercise identification information being a unique value assigned to each of the plurality of exercises, (ii) exercise category information indicating a type of each of the plurality of exercises, and (iii) position information indicating a position of corresponding data in a sequence of an entire input data to separately indicate where the corresponding data is located in the sequence of the entire input data, and wherein the position information is embedded together with the input data, added to the embedded input data, and input to the exercise processing unit of the first encoder neural network, wherein the exercise processing unit is configured to:

generate prediction data by performing operations of self-attention on the embedded exercise information, wherein the first non-linearization performing unit is configured to:

perform non-linearization on the prediction data to generate non-linearized prediction data, the generated non-linearized prediction data being first attention information, wherein the second encoder neural network is configured to:

perform operations of self-attention and non-linearization on the first attention information to generate second attention information, wherein the operations of self-attention and non-linearization performed by the second encoder neural network correspond to the operations of self-attention and non-linearization performed by the first encoder neural network, wherein the first decoder neural network is configured to receive only the response information as input among the exercise information and the response information, wherein the second embedding execution unit is configured to:

perform embedding of only the response information among the exercise information and the response information, the response information being composed of a plurality of responses R1, R2, . . . , Rk−1 of a user and input the embedded response information composed of the plurality of responses R1, R2, . . . , Rk−1 to the first response processing unit of the first decoder neural network, wherein the response information includes (i) position information indicating a position of corresponding data in a sequence of an entire input data to separately indicate where the corresponding data is located in the sequence of the entire input data, and (ii) response accuracy information indicating whether the user's response is a correct answer or an incorrect answer, and wherein the position information is embedded together with the input data, added to the embedded input data, and input to the first response processing unit of the first decoder neural network, wherein the first response processing unit is configured to:

generate prediction data by performing operations of self-attention on the embedded response information, the prediction data generated by the first response processing unit being query data, wherein the second response processing unit is configured to:

generate a correct answer probability of the exercise Ek based on the embedded response information and the second attention information by applying the second attention information as a weight for the query data, wherein the second non-linearization performing unit is configured to:

perform non-linearization on information output from the second response processing unit, wherein the user knowledge tracing system is trained by using the second attention information as the weight for the query data, and wherein the second decoder neural network is configured to:

perform operations of self-attention and non-linearization based on the correct answer probability of the exercise Ek to generate information corresponding to the correct answer probability of the exercise Ek, wherein the operations of self-attention and non-linearization performed by the second decoder neural network correspond to the operations of self-attention and non-linearization performed by the first decoder neural network, wherein the exercise processing unit of the first encoder neural network is configured to perform a first upper triangular masking on only the exercise information among the exercise information and the response information, wherein the first response processing unit of the first decoder neural network is configured to perform a second upper triangular masking on only the response information among the exercise information and the response information, wherein the first upper triangular masking and the second upper triangular masking are respectively performed in the first encoder neural network and the first decoder neural network, wherein each of the first upper triangular masking and the second upper triangular masking is an operation for preventing attention from being performed on information corresponding to a future position for prediction of a next exercise, and wherein at least one of the first embedding execution unit, the second embedding execution unit, the plurality of encoder neural networks and the plurality of decoder neural networks is implemented by a hardware component of the user knowledge tracing system.

\* \* \* \* \*